No. 759,950. PATENTED MAY 17, 1904.
W. N. WHITELY.
CROP GATHERING AND DISCHARGING ATTACHMENT
FOR MOWING MACHINES.
APPLICATION FILED AUG. 10, 1903.
NO MODEL.
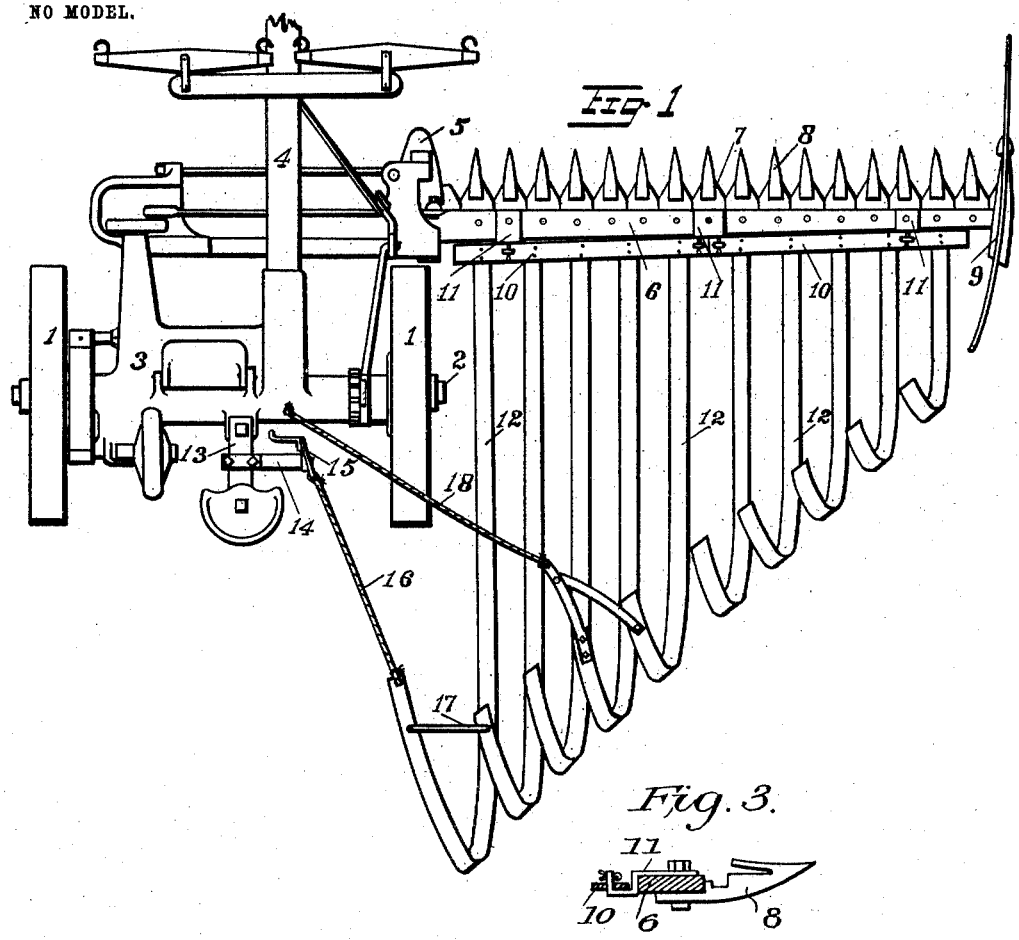
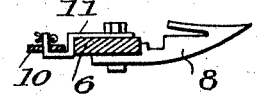
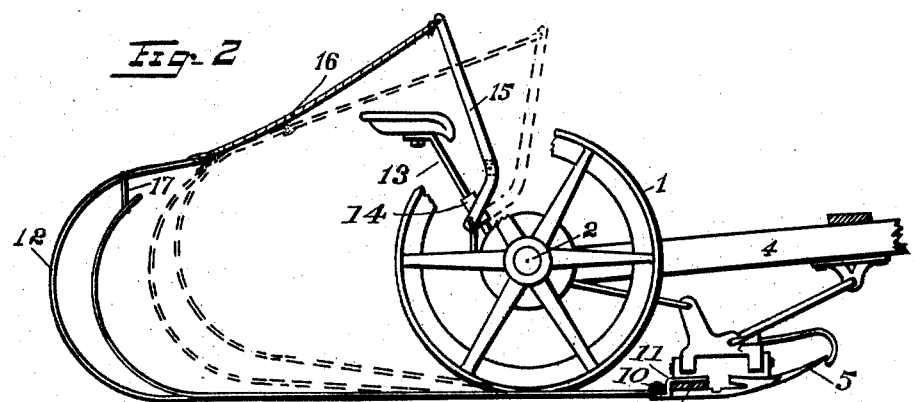
WITNESSES:
John L. Gilligan
Robert Weiskotten
INVENTOR
William N. Whitely No. 759,950. Patented May 17, 1904.

UNITED STATES PATENT OFFICE.

WILLIAM N. WHITELY, OF SPRINGFIELD, OHIO.

CROP GATHERING AND DISCHARGING ATTACHMENT FOR MOWING-MACHINES.

SPECIFICATION forming part of Letters Patent No. 759,950, dated May 17, 1904.

Application filed August 10, 1903. Serial No. 169,016. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Crop Gathering and Discharging Attachments for Mowing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in crop gathering and discharging attachments for mowing-machines by means of which the crop is gathered as cut and delivered in bunches or windrows at the will of the operator stubbleward of the platform and in rear of the truck portion of the machine out of the way of the team or master-wheels of the machine when cutting the next swath and is left in a loose uncompacted condition for curing. I attain these objects by the mechanism illustrated in the accompanying drawings, in which—

Figure 1 is plan view of an ordinary mowing-machine equipped with my improvements. Fig. 2 is a side elevation of same, partly in section, a portion of one of the driving and supporting wheels broken away to show the lever for raising and lowering the rearward ends of the stubbleward slats of the platform, the heavy lines indicating the position of the curved upward rearward ends of the stubbleward slats of the platform when discharging the cut crop in bunches or windrows at the will of the operator stubbleward of the slatted platform and in rear of the truck portion of the machine, the dotted lines indicating the position of the curved upward rearward ends of the stubbleward slats when drawn upward out of line with the other slats, so as to gather and hold the accumulating cut crop on the platform until desired to be discharged by the operator and also when turning at the corners, also shows the means for agitating the rearward ends of any number of the slats of the platform to cause the crop to continuously roll while accumulating or being discharged from the platform. Fig. 3 is a detail elevation, partly in section, showing the finger-bar and guard-finger attached thereto, also showing the manner of attaching the transverse bar to said finger-bar.

Similar figures refer to similar parts throughout the several views.

In said drawings, 1 1 represent the main driving and supporting wheels. 2 represents the main axle supported by said wheels 1 1. 3 represents the main frame mounted upon said axle 2 and supported by said driving and supporting wheels 1 1. 4 represents the pole or tongue of the machine attached to said main frame 3.

5 represents the inner shoe of the finger-bar.

6 represents the finger-bar securely attached to the main shoe 5.

7 represents the reciprocating knife.

8 represents the guard-fingers secured to the finger-bar 6 and through which the knife 7 reciprocates.

9 is the outside shoe secured to the grassward end of the finger-bar 6.

To the finger-bar 6 is secured the transverse bar 10 by means of the clamp 11. Secured to said transverse bar 10 is a series of rearwardly-extending slats 12, their forward portion sliding on the stubble, their rearward ends curved upwardly, as shown in Fig. 2, the stubbleward slats being longer than the grassward slats of said platform for side-delivery purposes, the rearward ends of said slats being substantially in a line at an angle relative to the finger-bar 6, said slats 12 being riveted or otherwise secured to said transverse bar 10.

Securely attached to the seat-support 13 by means of the clamp 14 is the lever 15, as shown in Fig. 1. Connected at or near the upward end of said lever 15 is a link 16, which extends rearwardly and connects to the rearward curved upward end of the stubbleward slat 12, as shown in Figs. 1 and 2, the rearward end of the stubbleward slat of said platform being pivotally connected to the rearward curved upward end of the slat located grassward of said stubbleward slat by means of a link 17, so that as the cut crop is accumulating on the slatted platform by means of the lever 15 and its rearward connection to the curved upward ends of the stubbleward slats of said platform the accumulated cut crop may be retained and held on said platform and drawn forward, as shown in Fig. 2, and when said lever 15 is released and returns to its normal position the rearward curved upward ends of the stubbleward slats of the platform will recede from the accumulated crop, as shown in heavy lines in Fig. 2, and allow said crop to pass stubbleward freely from said platform and be delivered rearward of the truck portion of the machine.

Near the middle of the slatted platform I employ a link 18, as shown in Fig. 1, its rearward end connected with the rearward ends of any number of the slats of said platform, the forward end of said link extending within reach of the operator, that while the cut crop is accumulating on the slatted platform preparatory to being delivered in bunches at the stubbleward side of the machine or for windrowing purposes said slats, to which said link 18 is connected, may be agitated by the operator in a direction to assist the rolling movement of the cut crop caused by the action of the stubble, and thereby provide a means to prevent the cut crop from becoming gorged on the slatted platform either while gathering on said platform when the rearward ends of the stubbleward slats are held up out of line with the slats grassward of same by the lever 15, so as to retain and hold the cut crop on the platform, or when the stubbleward slats are dropped down and the cut crop is being delivered from said platform stubbleward in a windrow. This agitating means I find is very necessary and desirable in connection with the holding of the cut crop on the platform by the stubbleward slats operated and controlled by the lever 15, because when held or retained on the slatted platform by the stubbleward slats and not allowed or permitted to escape from the platform the cut crop frequently stops rolling and becomes clogged on the platform and needs assistance to start it rolling from the platform. The operator may use his foot or hand to operate this link connection to agitate the rearward ends of any number of the slats of said slatted platform to agitate the cut crop and start it rolling. The up-and-down movement of said slats being in a direction forward and backward, it will be observed, assists materially in causing the crop to roll, especially if the crop to be cut is wet, green, or when the wind is blowing.

It will be observed in my construction that the forward motion of the machine draws the slatted platform forward while the stubble retains its hold upon the crop, thereby causing the crop to roll as the cut crop comes in contact with the curved upward portion of the slats of the platform.

In order to deposit the cut crop in bunches transverse to the line of travel of the machine, or in what is known as "cross-windrows," or to gather it in bunches on the platform and then discharge it, it will be observed I provide means for raising the rearward curved upward ends of a number of the slats upon the stubbleward side of said platform, and when one or more of said slats is raised up the crop is retained on the platform and will not roll off; but by said action of said stubbleward slats the crop will be retained and held on these stubbleward slats as well as on the remaining slats of said platform, as in a pocket, while the slats located grassward of said stubbleward slats remain in their normal condition. By this construction the rearward ends of any number of the stubbleward slats of the platform may be held up by the operator when turning corners, so as to hold and retain the cut crop upon the platform and avoid the twisting of the long slender slats. As soon as the stubbleward slats which have been raised upward out of line with the remaining slats are lowered into line with the other slats which have not been acted upon by the lever 15 the accumulating crop that has been gathering and rolling on said platform will pass off under ordinary conditions to the stubbleward side of said platform in rear of the truck portion of the machine; but I provide means that the operator can agitate said crop by raising and lowering the rearward ends of any number of the slats of said platform, as shown in Fig. 1, thus agitating the accumulating crop and causing it to start and roll off said platform stubbleward should the accumulated cut crop on said platform not move promptly. In some kinds and conditions of growing crops this may be found necessary where the crop to be cut is very heavy, green, wet, or entangled with pea-vines or badly matted together, and this provision is made to provide for the successful harvesting and delivering of such crops. The means I employ to accomplish this is to attach a connecting cord or link to the rearward curved upward ends of the stubbleward slats and to extend said connection forward to within reach of the operator, who may use his hand or foot to raise and lower said slats, as shown in Fig. 2. The slats may be moved mechanically or automatically by an engaging and disengaging mechanism. The operator can act at will to operate this mechanism—that is, to move the rearward ends of the slats up and down; but it is necessary that this be done at the will of the operator; otherwise bunches could not be delivered in cross-windrows at their proper places as the machine moves forward.

My improvements are shown applied to a side-draft front-cut mowing-machine in which the finger-bar is located forward of a line passing through the center of the master-wheels, the finger-bar being located in front of the slats of the platform, as shown in Fig. 1, and one of the main driving and supporting wheels located near the stubbleward side of said platform. While I prefer to act upon said slats at their rearward ends to raise and lower them, as shown in the drawings, as these slats are made of flexible material my invention would not be limited by a connection to the slats at any other point that would give the desired result, although I consider the action by connection on the rearward ends of the slats more positive than if connected elsewhere. I prefer that when the curved upward ends of the stubbleward slats are raised upward by the lever 15 and by means of its pivotal link connection 17 between the stubbleward slat and its companion slat that the rearward end of the stubbleward slat be drawn farther upward than the slat located grassward of same and to which it is connected by the link 17. The object of this is to reduce the opening or space between the stubbleward slats and the slats grassward when accumulating the crop and to more securely retain it on the platform until discharged by lowering the slats that have been raised up.

What I claim, and desire to secure by Letters Patent, is—

1. In a side-draft front-cut mowing-machine, in combination, a finger-bar, a slatted platform attached to said finger-bar, the forward portion of the slats of said platform adapted to slide on the stubble, the rearward ends of the slats curved upwardly, said slats longer at the stubbleward side of the platform than at the grassward side for side-delivery purposes, means provided for the operator to raise and lower the rearward ends of a predetermined number of the stubbleward slats to hold the crop from rolling off the platform while accumulating, and to lower said slats to discharge the crop by a rolling motion given it by the stubble as the machine moves forward.

2. In a mowing-machine, in combination, a finger-bar, a slatted platform attached to said finger-bar, the forward portion of the slats of said platform adapted to slide on the stubble, the rearward ends of the slats curved upwardly, said slats longer at the stubbleward side of the platform than at the grassward side for side-delivery purposes, connecting mechanism from the rearward ends of a predetermined number of the stubbleward slats to the operator to raise and lower said slats to hold the crop and discharge it at will.

3. In a mowing-machine, in combination, a finger-bar, a slatted platform attached to the finger-bar, the forward portion of the slats of said platform adapted to slide on the stubble, the rearward ends of the slats curved upwardly, said slats longer at the stubbleward side of the platform than at the grassward side for side-delivery purposes, a lever pivotally mounted upon the truck part of the machine, connecting means from said lever to the rearward ends of a predetermined number of said slats of said platform to raise and lower said slats for the purposes described.

4. In a mowing-machine, in combination, a finger-bar, a slatted platform attached to the finger-bar, the forward portion of the slats of said platform adapted to slide on the stubble, the rearward ends of the slats curved upwardly, said slats longer at the stubbleward side of the platform than at the grassward side for side-delivery purposes, connecting means from the rearward end of the stubbleward slat of said platform extending within reach of the operator, connecting mechanism between the two stubbleward slats of said platform that the operator may raise the stubbleward slat higher than its companion to securely hold the crop on the platform until desired to be discharged.

5. In a mowing-machine, in combination, a finger-bar, a slatted platform attached to the finger-bar, the forward portion of the slats of said platform adapted to slide on the stubble, the rearward ends of the slats curved upwardly, said slats longer at the stubbleward side of the platform than at the grassward side for side-delivery purposes, means for raising and lowering a predetermined number of the rearward ends of the stubbleward slats of said platform for bunching purposes, separate and independent means for agitating the rearward ends of a predetermined number of the slats of said platform to roll the crop while accumulating on or being discharged from said platform.

In testimony whereof I affix my signature in presence of two witnesses.

WILLIAM N. WHITELY.

Witnesses:
JOHN L. GILLIGAN,
ROBERT WEISKOTTEN.